United States Patent [19]

Dinkler et al.

[11] Patent Number: 4,460,666
[45] Date of Patent: Jul. 17, 1984

[54] COATED SUBSTRATE, PREPARATION THEREOF, AND USE THEREOF

[76] Inventors: Leonard R. Dinkler, 1536 NW. 7th Ave., Gainesville, Fla. 32603; Saverio F. Pensabene, 4204 NW. 19th Pl., Gainesville, Fla. 32605

[21] Appl. No.: 324,498

[22] Filed: Nov. 24, 1981

[51] Int. Cl.³ .............................................. H01M 4/80
[52] U.S. Cl. ..................................... 429/236; 429/94; 429/241; 429/245
[58] Field of Search ............................... 429/234–237, 429/241–245, 222, 223, 45, 233, 94; 428/615

[56] References Cited

U.S. PATENT DOCUMENTS

| | | | |
|---|---|---|---|
| 3,214,355 | 10/1965 | Kandler | 429/235 X |
| 4,105,832 | 8/1978 | Sugalski | 429/222 X |
| 4,151,331 | 4/1979 | Hug et al. | 429/245 X |
| 4,215,190 | 7/1980 | Ferrando et al. | 429/235 X |
| 4,251,603 | 2/1981 | Matsumoto et al. | 429/235 X |

Primary Examiner—Charles F. Lefevour

[57] ABSTRACT

A conductive substrate wherein the major surfaces thereof are embossed and wherein coated on at least one of the major surfaces is a sintered porous metal powder coating, and preparation of the substrate. The substrate is especially suitable as an electrode in an electrolytic cell when the substrate includes an electrochemically active material within the pores of the sintered porous metal powder coating.

2 Claims, 4 Drawing Figures

COATED SUBSTRATE, PREPARATION THEREOF, AND USE THEREOF

DESCRIPTION

1. Technical Field

The present invention is concerned with substrates coated with a sintered porous metal powder coating, preparation thereof, and use thereof. The coated substrates of the present invention are especially suitable in providing electrodes for electrolytic cells. Electrolytic cells of particular importance are the rechargeable secondary nickel-cadmium cells.

2. Background Art

A cell plate or electrode in an electrochemical cell is made up of a substrate of thin sheet-like material with a layer of active material on each side. One type of rechargeable secondary battery of particular importance is the nickel-cadmium device of the sintered plate construction. Such are made up of a nickel hydroxide cathode and a cadmium anode separated by a porous separator, such as nonwoven nylon or polypropylene. The anode/separator/cathode sandwich either is wound into a tight roll or stacked to form a cell pack. The cell pack is contained in a protective case, such as a stainless steel, nickel, or nickel-plated steel case. The case for the roll type construction is cylindrical. The flat cell pack is usually contained in a container of prismatic configuration. An example of an electrolyte employed is a solution of potassium hydroxide in water.

The positive electrode can be constructed by impregnating nickel nitrate into a porous pure nickel sintered sponge-like structure. The porous nickel is provided on a smooth thin sheet-like substrate. However, one problem that occurs during the sintering is that the elevated temperatures employed tend to deform the thin substrate somewhat and cause it to stretch. Because of this, the ability to provide a uniform sintered coating is quite difficult. In addition, in view of the distortion and stretching that occurs, the amount of material that can be placed on the strip during sintering is somewhat limited. Attempts to compensate for this problem due to the sintering have been to use thicker substrates, which, of course, results in a higher cost and larger finished electrolytic cells. Moreover, the amount of perforations that could be present on a substrate for a sintering operation is extremely limited in view of the distortion and stretching which can occur during the sintering operation. Other problems which occur include the difficulty in providing sufficient area or contact between the substrate and the powdered metal to achieve a good metallurgical bond in the sintering process. Accordingly, great care has been exercised in selecting suitable powders depending upon shape, size and density in order to maximize the metallurgical bonding.

The nickel nitrate is converted to nickel hydroxide in the chemical impregnation process by precipitation, for instance, from sodium hydroxide. Another process yields the nickel hydroxide via an electrochemical impregnation procedure.

Construction of the negative electrode starts by impregnating the nickel-sintered coated substrate with a cadmium nitrate solution. Cadmium nitrate is converted to cadmium hydroxide by precipitation in a caustic solution. Alternative negative electrode processes include electrochemical impregnation into a sintered structure, application of a cadmium oxide paste to a metallic carrier, and electrodeposition onto a metallic carrier followed by mechanical compression.

In addition, nickel-iron and nickel-zinc as well as other similar types of batteries can be prepared by processes similar to those described above.

SUMMARY OF INVENTION

The present invention is concerned with a coated embossed electrically conductive substrate which contains a sintered porous metal powder coating on at least one major surface thereof. The present invention is also concerned with a process for the preparation of such substrate.

Another aspect of the present invention is an electrolytic cell containing the above-discussed coated embossed substrate wherein electrochemically active material is present within the pores of the porous coating.

DESCRIPTION OF PREFERRED AND VARIOUS EMBODIMENTS OF INVENTION

Figure 1:
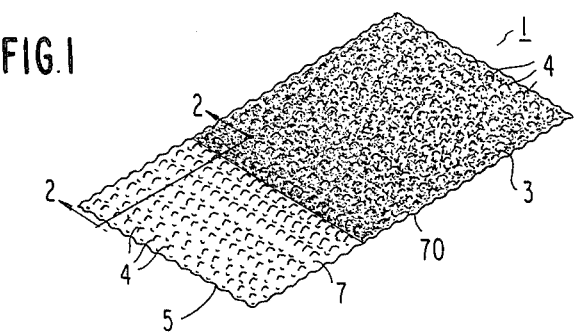
FIG. 1 is a fragmentary perspective view of a coated substrate in accordance with the present invention.
Figure 2:
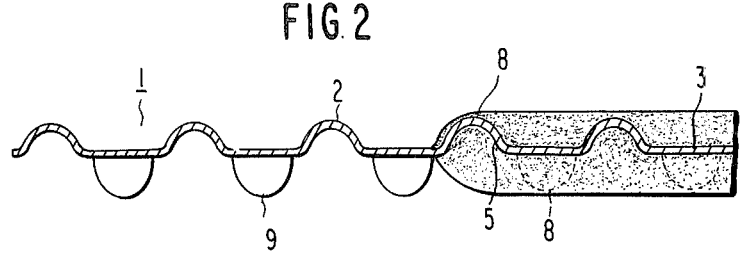
FIG. 2 is a cross section of the substrate taken along line 2—2 of FIG. 1.

Referring to FIGS. 1 and 2, a substrate in accordance with the present invention is generally denoted by numeral 1. The material used for this substrate is electrically conductive and is preferably a metallic material, such as nickel, stainless steel or nickel-plated steel. The substrate prior to embossing is generally about 2 to about 4 mils thick. The major surfaces 3,5 of the substrate and preferably substantially the entire substrate are embossed by any available convention means (not shown) typically utilized for knurling or embossing bulk metallic materials to produce closely spaced bosses 4, preferably about 2 to about 150 mils apart. In a typical example the bosses are about 50 mils apart and are arranged as alternating rows of peaks and valleys at an angle of about 60° to the edge 70 of the substrate. About 7 peaks and valleys in a row per cm of substrate are present in a typical example. In a preferred embodiment of the present invention the depth of the bosses from the peak of one boss to the bottom of the valley of another boss is about 15 mils. A uniform pattern of bosses is impressed in the substrate 1 such that in one of the major surfaces the recess 9 of one boss is adjacent the projection 2 of another boss recessed from the opposite major surface. The projection 2 and recess 9 are offset from each other such that the material does not have a preferred "hand". In other words, the arrangement of the bosses is made such that the major surfaces 3,5 are interchangeable as to their operative aspects in accordance with the present invention.

The maximum practical number and/or size of the dimples or bosses for a nonperforated substrate are related to the substrate thickness, since for any particle thickness the substrate can only be stretched to a certain finite value before the substrate is broken through. The minimum number and/or size of dimples depends upon the minimum improvement that would be tolerable under a particular set of conditions. A typical example of embossing provided about a 20% increase in surface area compared to the nonembossed substrate. The dimples or bosses are preferably as irregular in shape as possible. One typical shape employed is a rounded top pyramid structure. The substrate is preferably nonperforated. However, in view of the added strength characteristics provided by the dimpling, a perforated plate structure can be utilized. A powder containing composition to be subsequently sintered is applied to the substrate. Examples of suitable powdered metals include copper, iron, stainless steel, and preferably nickel. The preferred nickel powder has a chain-like, spikey structure and an apparent density of about 0.45 to about 1 g/cm$^3$, and an average particle size as measured with a Fisher Subsieve Sizer of about 2.6 micron to about 3.6 micron. In addition, the surface area, as determined with BET methods should be as large as possible, and preferably not below about 0.5 m$^2$/g. The following Table presents physical and chemical characteristics of some typical nickel powder available from International Nickel.

thixotropic agents are cellulose derivatives, such as the sodium salt of carboxymethylcellulose. Preferably, the slurry employs deionized water. The aqueous solution contains about 1 to about 5% by weight of the cellulose material. The slurry generally contains about 0.1 to about 2 parts, and preferably about 0.1 to about 1 part of metal powder per part of cellulose solution. A particularly preferred composition contains about 62 parts by weight of nickel powder per 121 parts by weight of slurry. The substrate is continuously passed through a container filled with the metal slurry. The substrate takes up a certain amount of the slurry on both sides. The amount is adjusted to the correct value by a pair of scrapers, rolls or doctor blades. In addition, at least one end 7, and preferably both ends, of the strip are wiped clean of the slurry so as to provide a noncoated area 7 for subsequent attachment of a tab in preparing the final electrode.

In accordance with the present invention, the process involves continuously passing strips through the slurry, wiping those areas clean which are to be subsequently used for tab connection by use of a flexible elastomeric

| | Physical Properties | | | | | | |
|---|---|---|---|---|---|---|---|
| Powder Type | Apparent Density (measured with Scott Volumeter), g/cm$^3$ | Average Particle Size (measured with Fisher Sub-Sieve Sizer), μ | C | O$_2$ | Chemical Analysis Composition, wt. % S | Fe | Ni |
| 255 | 0.45–0.6 | 2.6–3.4 | 0.05–0.15 | 0.05–0.15 | <0.001 | <0.01 | Balance |
| 270 | 0.6–0.8 | 2.7–3.5 | 0.05–0.15 | 0.05–0.15 | <0.001 | <0.01 | Balance |
| 287 | 0.8–1.0 | 2.9–3.6 | 0.05–0.15 | 0.05–0.15 | <0.001 | <0.01 | Balance |

A preferred nickel powder is Type 255. The sintering process is a thermal process through which the individual metal particles are transformed to a coherent film without reaching the melting point of the metal. Two basic methods are generally employed for the sintering. One method uses a loose powder technique; whereas, the other method employs a slurry containing the powder metal.

In the first loose powder method, metallic powder, such as nickel, is passed through a screen into a form made by machining a suitable cavity in a plate, such as a graphite plate. When the form is half full, the powder is spread with a scraper or similar device to form a smooth layer. The substrate is placed on this layer and is covered by the remainder of the metal powder which is spread in the same manner as before. Excess powder is removed by a doctor blade or plow, and a graphite cover plate is placed on top of the form.

The forms are then transferred to a sintering furnace which can be of the continuous mesh-belt type. The forms are loaded on the belt and are passed first through a preheat chamber, then a high temperature zone and finally a cooling zone. The temperature in the sintering zone is generally about 800° to about 1000° C. The sintering time in the high temperature zone is about 5 to about 20 minutes. In order to prevent oxidation of the metal, such as the nickel, a protective atmosphere is maintained in the furnace. Such atmosphere is usually either inert or reducing with the reducing type of atmosphere being the most common, such as mixtures of hydrogen and nitrogen.

The preferred method of coating employed according to the present invention is a slurry method. In such procedure, metal powder is mixed with a viscous aqueous solution containing a thixotropic agent. Suitable wiper. It is important to the present invention that the wiper employed be flexible so that it will conform to the dimpled structure to remove material from both the peaks and valleys of the dimpled structure.

Next, the coated substrate is passed through a vertical drying zone where the water is evaporated and then through a sintering furnace which is also vertical. This arrangement along with the additional weight placed on the substrate and the high temperatures in the sintering furnace have caused problems with respect to stretching and distortion of the substrate. However, in accordance with the present invention, the presence of the dimples or bosses on the substrate provide additional strength and thereby minimize the distortion and stretching of the sheet. This, in turn, makes it possible to use thinner substrates. For instance, when previously a 4 mil substrate was deemed necessary, it is possible to use a 2-mil substrate when employing the embossed and dimpled surfaces as taught pursuant to the present invention. Also, it is possible to provide perforations and greater amounts of perforations in the substrate if desired in view of the present of the dimples. The present invention also greatly improves the uniformity of the coating on the substrate as compared to smooth substrates.

The embossed structure also provides for increased adhesion of both the powder or slurry prior to sintering, and more importantly, greater contact area to achieve metallurgical bonding after the sintering process.

The bosses also assist when the coated sheets are passed over rollers being conveyed to the oven, since such provides some means for stretching along the lines of an expansion joint.

The present invention also makes it possible to increase the speed of sintering. The drying step in the slurry method is also improved, since slumping of the slurry due to a decrease in the viscosity at the elevated temperatures of drying is reduced. In addition, it is possible to use a slurry of reduced viscosity since the dimples help maintain the slurry in place prior to drying and sintering. Moreover, thicker coatings are possible, since the dimples reduce the flow of the coating. Dimpled perforated substrates have been suggested in U.S. Pat. No. 4,105,832 to Sugalski and assigned to the assignee of the present application. However, the specific coatings on the substrate disclosed explicitly therein did not include the sintered type of coating as required by the present invention and did not require a type of metallurgical bond as necessary in accordance with the present invention. The type of bonding explicitly shown in said patent involves a physical, rather than metallurgical bond between individual metal particles.

It is noted that in view of the advantages achieved by the present invention, the shape of the particles is not as critical as when employing nondimpled substrates, and less dendritic powder can be used with less tendency for the bonding or shape of the particles to collapse. This renders the process more versatile. Also, in view of the improved technique, the same thickness of the final metal coating can be achieved using less metal powder. Furthermore, in view of the increased sites for bonding in the substrate, electrodes obtained have improved current distribution and more uniform current distribution.

The presence of dimples also provides for better handling in subsequent treatments such as electrochemical cleaning and impregnation with the electrochemically active material.

After sintering, typically the combined thickness of the dimpled substrate 1 and sintered coating 8 on both sides of the substrate is about 10 to about 50 mils. As shown in FIG. 2, said combined thickness of the coated portion is substantially uniform. If desired, the porous coating 8 can entirely cover the dimples 4 or can be wiped clean of the peaks of the dimples to expose the peaks. This later type is preferably for plates wherein swelling is not permitted, and thereby the absolute plate thickness of the coated substrate would be fixed, and influence of swelling due to the porous nickel containing the active ingredient would be eliminated.

This latter type of plate provides for increased heat transfer and, therefore, higher sintering speeds.

An additional advantage of the present invention is that during the coating operation and during the use of the doctor blade or scraper the criticality of this step is greatly reduced. For instance, in the extreme situation where the wiping mechanism would wipe clean against the substrate, there would still be sintered metal in the dimple itself, whereas in normal nondimpled, nonperforated substrate there would be no sintering metal at all.

The sintered metal provides coating which provides for containing the active electrochemical materials to be subsequently added. For the preferred nickel material, the porosity (i.e. volume of pores/apparent volume of metal+pores) is usually about 80 to 87%. The typical surface area after sintering is about 0.1 to about 1 $m^2/g$. The pores are interconnected in the coating, the mean pore diameter is usually about 1 to about 20 microns and preferably about 6 to about 12 microns, and at least about 60% of the total pore volume is represented by pores of about 4 to about 15 microns. These figures are based on measurements made by the mercury instrusion principle. In order to prepare the electrodes, the porous coated substrates are impregnated with the electrochemically active material. Such involves submerging the coated substrate into an aqueous solution of a suitable salt, such as a nickel or cadmium salt for nickel-cadmium batteries and then subjecting it to a chemical, electrochemical, or thermal process to precipitate, for instance, finely divided nickel hydroxide in the pores of the positive electrodes, and metallic cadmium, cadmium hydroxide or cadmium oxide in the negative electrodes. Details of particular impregnation methods, as well as sintering methods and ways in which the tabs can be attached to the substrate can be found in Salkind et al, "*Alkaline Storage Batteries*", John Wiley & Sons, New York, "The Manufacture of Nickel Cadmium Sintered Type Batteries", pp. 111-154, 1969, disclosure of which is incorporated herein by reference.

In the application of this invention to specific cell or battery constructions, any number of well-known, conventional configurations may be employed. For example, the flat plate construction and the spiral construction shown in FIG. 3 and 4, respectively, may be employed in accordance with the present invention.

Figure 3:
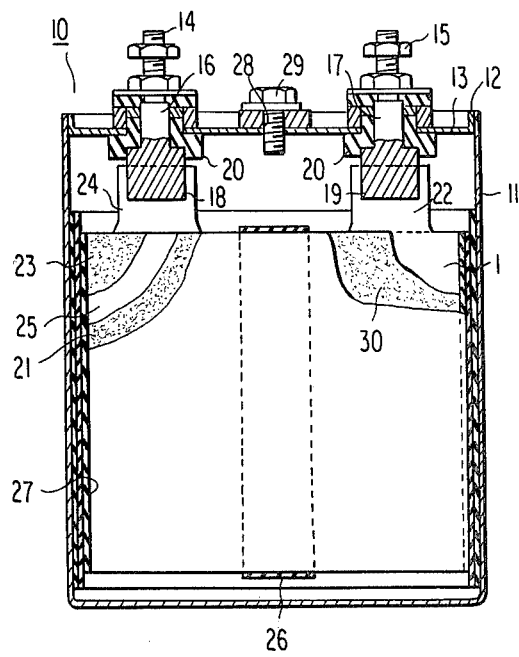
FIG. 3 is an axial section, partially broken away, of a battery in which an electrode containing a coated substrate as shown in FIG. 1 may be incorporated.

In FIG. 3, a rechargeable, sealed secondary battery 10 is shown to illustrate the parallel plate construction. The cell 10 has a casing 11 comprising an open top casing portion 12 with generally rectangular configuration which may be made of electrically insulating material or metal as illustrated. The open top of the housing portion 12 is sealed by top wall 13 which may be made of electrically insulating material or metal. Top wall 13 carries a positive terminal 14 and a negative terminal 15. The terminals 14 and 15 have conductive portions 16 and 17, respectively, which extend through and below the top wall 13 and carry, respectively, connecting tab portions 18 and 19. Since top wall 13, as shown, is metal, the terminal structure includes an electrically insulating gasket between wall 13 and each terminal 14 and 15.

A negative plate 21 comprises the substrate 2 with a connecting tab 22 connected thereto in any suitable manner, such as by welding. A positive plate 23 comprises a substrate 2 with a connecting tap 24 connected thereto in any suitable manner, such as by welding. The substrates 2 of the negative and positive plates are coated with a sintered porous metal coating, such as nickel, on each side thereof and containing an electrochemically active material, such as nickel hydroxide and metallic cadmium in the pores of the sintered porous layer, as discussed hereinabove. The connecting tabs 22 and 24 are connected to the tabs 18 and 19, respectively, by any suitable conventional method. Separator 25 of a suitably chemically inert material, such as nonwoven nylon or polypropylene, is positioned between adjacent plates. Separator 25 is preferably in the form of a tab and wound around the plate stack so as to position the separator material between the plates. A suitable electrolyte, such as potassium hydroxide, is impregnated into the separator, thereby making an electrolytic connection between the negative and positive plates 21 and 23. The bonding strip 26 of electrically insulating materials is preferably used to hold the plates and the separator within the minimum volume. A 2-piece electrically insulated plastic cell liner 27 surrounds the plate, separator material, and binding strip whereby these components are held in a compact arrangement and are electrically insulated from metal casing 12. Of course, if the casing portion is made of an electrically insulating material, such plastic liner can be dispensed with. A vent cap 29 closes aperture 28, thereby providing a sealed or nonvented cell.

Figure 4:
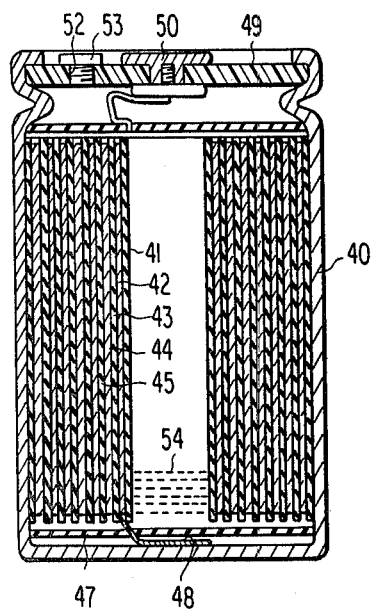
FIG. 4 is an axial section of another embodiment of a battery in which an electrode having a coated substrate in accordance with FIG. 1 may be incorporated.

A spiral plate construction is illustrated in FIG. 4. The battery includes an electrically conductive casing 40, forming one terminal of the cell. Within the cell is mounted a winding spindle 41 formed of insulating material and having spirally wound thereon a 4-layer assembly consisting of a first layer 42 which is the negative plate, a second layer 43 formed of a porous insulating separator, a third layer 44 which is a positive plate, and a fourth layer 45 which is a porous insulating separator. The positive and negative plates, as in the flat plate construction of FIG. 3, comprise a substrate 2 with a porous sintered metal layer and electrochemically active material contained in the pores of the sintered metal layer on each side of the substrate 2. To prevent short-circuiting between the edges of the plates and the cell casing, annular insulating disks 46 and 47 are provided. The negative plate 42 is connected to the cell casing 40 through lead 48. To provide a negative cell terminal, an insulating element 49 is mounted to the upper end of the conductive casing by crimping. The element mounting positive terminal 50 is connected to the positive plate 44 by lead 31. A port 52 is provided in the insulating element for the admission of any conventional electrolyte, such as potassium hydroxide, to the cell. As shown, the port is provided with a plug 53. The electrolyte is drawn between the plates by capillary action of the porous insulating spacers. Excess electrolyte fills the bottom of the casing and may extend upwardly into the winding spindle to a level 54.

The batteries illustrated in FIGS. 3 and 4 preferably comprise rechargeable, secondary, nickel-cadmium cells. Such a cell in its discharge state has a negative plate comprising cadmium hydroxide as the active material within the pores of the sintered porous metal layer and a positive plate comprising divalent nickel hydroxide as the active material within the pores of the porous sintered metal layer. It is well understood, as discussed hereinabove, that other active materials are readily usable in accordance with the configuration of the present invention.

In addition, it is well understood that the present invention is applicable to providing structures other than anodes and cathodes, such as for providing metal filters and anodes and cathodes used for preparation of such compounds as caustic and chlorides.

What is claimed is:

1. An electrode for a rechargeable electrochemical cell comprising:
    an electrically conductive metallic substrate having two major surfaces and being embossed to provide a substantial plurality of dimples projecting from at least one of said major surfaces and providing a plurality of recesses in the other of said major surfaces, said dimples having a reduced cross-sectional thickness less than the cross-sectional thickness of said substrate, said reduction in cross-sectional area effecting an increase in the surface area of said substrate of up to approximately 20% and thereby providing additional sites at which metallurgical bonding may occur;
    a sintered porous nickel coating disposed substantially over each of said major surfaces to provide a coating over each of said major surfaces, said sintered porous nickel coating filling said recesses and being disposed between said dimples, said sintered porous nickel coating sintered and adhered to said dimples by metallurgical bonds between said coating and said dimples at said additional sites; and
    an electrochemically active material impregnated within the pores of said sintered porous nickel coating.

2. An electrolytic cell comprising:
    a casing;
    a sandwich structure disposed in said casing, said sandwich structure comprising a positive plate, a negative plate and a separator disposed between said positive plate and said negative plate, wherein at least one of said plates comprises
    (a) an electrically conductive metallic substrate having two major surfaces and being embossed to provide a substantial plurality of dimples projecting from at least one of said major surfaces and providing a plurality of recesses in the other of said major surfaces, said dimples having a reduced cross-sectional thickness less than the cross-sectional thickness of said substrate, said reduction in cross-sectional area effecting an increase in the surface area of said substrate of up to approximately 20% and thereby providing additional sites at which metallurgical bonding may occur;
    (b) a sintered porous nickel coating disposed substantially over each of said major surfaces to provide a coating over each of said major surfaces, said sintered porous nickel coating filling said recesses and being disposed between said dimples, said sintered porous nickel coating sintered and adhered to said dimples by metallurgical bonds between said coating and said dimples at said additional sites;
    (c) an electrochemically active material impregnated within the pores of said sintered porous nickel coating; and an electrolyte in said casing.

* * * * *